United States Patent [19]
Srbljic et al.

[11] Patent Number: 6,154,811
[45] Date of Patent: *Nov. 28, 2000

[54] SCALABLE NETWORK OBJECT CACHING

[75] Inventors: Sinisa Srbljic, Velika Gorica, Croatia; Partha P. Dutta, San Jose, Calif.; Thomas B. London, Mountain View, Calif.; Dalibor F. Vrsalovic, Sunnyvale, Calif.; John J. Chiang, San Francisco, Calif.

[73] Assignee: AT&T Corp., New York, N.Y.

[*] Notice: This patent is subject to a terminal disclaimer.

[21] Appl. No.: 09/204,343

[22] Filed: Dec. 4, 1998

Related U.S. Application Data

[63] Continuation of application No. 08/827,763, Apr. 10, 1997, Pat. No. 5,933,849.

[51] Int. Cl.[7] .................................................. G06F 12/00
[52] U.S. Cl. ........................ 711/118; 711/124; 711/130; 707/205
[58] Field of Search ................................... 711/124, 123, 711/130, 118; 707/205; 395/200.46

[56] References Cited

U.S. PATENT DOCUMENTS

| | | | |
|---|---|---|---|
| 5,317,739 | 5/1994 | Elko et al. | 395/200.46 |
| 5,452,447 | 9/1995 | Nelson et al. | 707/205 |
| 5,493,668 | 2/1996 | Elko et al. | 711/130 |
| 5,787,470 | 7/1998 | DeSimone et al. | 711/124 |

*Primary Examiner*—Do Hyun Yoo
*Assistant Examiner*—Mehdi Namazi
*Attorney, Agent, or Firm*—Kenyon & Kenyon

[57] ABSTRACT

A scalable distributed caching system on a network receives a request for a data object from a user. The caching system carries out a locator function that locates a directory cache for the object. The directory cache stores a directory list that identifies the locations of object caches that purport to store copies of the object requested by the user. The object caches on the object directory list are polled, and in response send messages to the cache that received the user request indicating if each object cache stores a copy of the requested object. The receiving cache sends a message requesting a copy of the object to the object cache that sent the message first received by the receiving cache indicating that an object cache stores the requested object. The object cache that sent the first received message then sends a copy of the object to the receiving cache, which stores a copy and then sends a copy to the user. The directory list for the object is then updated by adding the network address of the receiving cache. Outdated copies of objects stored on object caches are deleted in a distributed fashion to maintain the coherence of the cached copies. This is further reinforced by the association of time-to-live parameters with the each copy and each object cache address on directory lists.

21 Claims, 8 Drawing Sheets

SCALABLE NETWORK OBJECT CACHING

CROSS-REFERENCE TO RELATED APPLICATION

This application is a continuation of U.S. application Ser. No. 08/827,763, filed on Apr. 10, 1997, now U.S. Pat. No. 5,933,849.

FIELD OF THE INVENTION

This invention relates to caching objects on a network, and particularly to using a scalable distributed directory to manage cached objects.

BACKGROUND OF THE INVENTION

Data object caching is used to improve the scalability of network information services. Caching helps reduce degradation of service on a network that can arise when a large number of data objects are added to the network. Without caching, when a user requests a data object through a network, the source of the data object is requested to send a copy. On a large network with many remote sites and numerous data objects, this request may take a long period of time to process, or may not be able to be processed at all due to the condition of the network, network traffic, and the condition of the source of the data object. A caching system stores copies of a data object in at least one place besides the source of the object, often at a location nearer the requester. The existence of at least one alternate source for the object, as well as its potentially more convenient situation in relation to the requesting user, improves the service of delivering a copy to a requesting user quickly and successfully.

An example of a network on which object caching is used is the Internet. Caching can be used on the Internet by caching a copy of a hypertext file (e.g., from a website) on at least one server connected to the Internet besides the original source server. For example, rather than having to send for a popular file on a Japanese server each time the file is requested by clients in the United States over the World Wide Web on the Internet, the file can be copied and stored on a cache server in the United States. Subsequently, other United States clients requesting the file may obtain it from the United States cache server rather than from the server in Japan. This is advantageous because both the request and the copy need to traverse fewer routers and nodes in the Internet between the cache server and the requester than the original source server in Japan. Hence, delay is reduced in obtaining the copy, and the copy is more likely to be successfully received by the requesting user. In this way, the cost and latency (delay) in obtaining the Japanese file for clients in the United States is substantially reduced.

A caching system can be understood as having three functional components. First, the cache has a search system that determines the locations of cached copies of a data object requested by a user. Second, the caching system has a decision system that decides which copy to retrieve if more than one cached copies of the requested object are located by the search system. Finally, a maintenance system helps to ensure that old outdated copies of an object are removed from caches, and generally to maintaining the accuracy of the information stored by the caching system.

A known hierarchical caching system is shown in FIG. 1. A client 101 submits a request for a data object to cache server A 102. Hereinafter, the term "cache" is meant to refer to a cache server. Cache A 102 (the cache that receives an object request from a client) is generally situated "near" the client in a network sense. That is, cache A and the client are able to communicate quickly and reliably either directly or through a network, or at least more quickly and reliably than the client 101 could communicate with other servers. It should be noted that a cache server that is "near" a client in a network sense may be geographically further away from the client than other servers that are less "near" the client in the network sense.

The client's request can be sent through a network (not shown) connecting the client 101 with cache A 102. If cache A has a copy of the object, it sends a copy of the object to client 101. If cache A 102 does not have the requested data, it must search for a cached copy. Cache A 102 first sends requests to neighboring caches on the same hierarchical level, i.e., cache B 103, cache C 104 and cache D 105. Caches A 102, B 103, C 104 and D 105 can be connected through a network (not shown). Each of these caches responds to the request from cache A 102 by sending a message to cache A 102 indicating whether or not the responding cache has a copy of the requested object. If the caches on the same level do not have the requested object, cache A 102 sends a request for the object to cache E 106 at the next hierarchical level. Cache A 102 can be connected to cache E 106 through a network (not shown). Likewise, if cache E 106 does not have the object, cache E 106 polls the caches on its hierarchical level, caches F 107 and G 108. Caches E 106, F 107 and G 108 can be connected by a network (not shown). If these caches also do not have the object, a message is sent to server 109 on which the original version of the object resides. The message sent to server 109 requests that server 109 send a copy of the requested object to the client 101. If a single cache sends a message indicating that it has a copy of the object, the cache is asked to send a copy of the object to the client 101. On the other hand, if more than one cache sends a message indicating that it has a copy of the object, then a decision function must be implemented to select which cache is to send its copy of the object to the client 101.

A known decision system is illustrated in FIGS. 2, 3 and 4. Client 201 sends a request (denoted "request (1)" in FIG. 2) for an object to cache A 202. Cache A 202 determines if it has a copy. If it does, it sends the copy to client 201. If it does not have a copy, cache A 202 sends a request called a UDP ping request denoted "UDP_ping_req. (2)" to all of its neighboring caches 203–207. The number in the parentheses next to each message (e.g., as in "request (1)", "UDP_ping_req (2)") denotes the order in which the message is sent.

As shown in FIG. 3, each neighbor cache responds with either a UDP ping hit message (denoted "UDP_ping_hit" in FIG. 3) if it has a copy of the object, or a UDP ping miss message (denoted "UDP_ping_miss" in FIG. 3) if it does not have a copy of the object. If no UDP ping hit message is received, then the original source server is asked to send a copy of the requested object. If only one UDP ping hit message is received by cache A 302, cache A 302 sends a message requesting the only cache having the copy to send a copy of the object to client 301. If more than one UDP ping hit message is received, as shown in FIG. 3, then cache A 301 must decide which cache is to be requested to send a copy of the object to client 301. In this prior art, cache A 302 sends a message ("request (1)") in FIG. 4 requesting a copy of the object to that cache from which cache A 302 received its first UDP ping hit message, cache E 403 (FIG. 4). This decision function is designed to obtain the copy that is "nearest" to cache A 302 (and hence to the client 301) in the network sense. This results in the smallest delay and greatest reliability in obtaining a copy of the requested object.

The copy is sent from cache E 403 to cache A 402 (copy (2)), and a copy of the object is stored at cache A 402, which is "nearer" to the client 401 in the network sense than cache E. As a result, future requests for the object from the client 401 will not require a search of caches other than cache A 402. Next, a copy of the object is sent from cache A 402 to the client 401 (copy (3)). In another embodiment of the prior art, the request asks cache E 403 to send a copy of the object directly to the client 401, bypassing cache A 402.

This prior art embodiment caching system reduces latency (the delay between the request and receipt of a copy of an object) and improves the reliability of fetching a copy of a requested object in smaller networks with relatively few data objects. But in larger systems, such known methods scale poorly. Consider a caching system where the cache that receives a client request (hereinafter, the "receiving cache") for an object has N neighbors. The caches generate 2N+1 messages for each client request, not including the messages that carry the requested copy of the object. This represents two messages per neighbor cache (a UDP ping request and either a UDP ping hit or UDP ping miss response), plus the request message from the client. Such a large number of messages can significantly burden a large network that has many data objects. Each added cache increases the number of messages generated by the caching system by two.

A known solution to this problem is to use a directory that cross-indexes the identities of data objects with the locations of caches at which the objects are stored. This eliminates the need for a full-scale search of all caches, reducing the amount of message traffic with which the caching system burdens the network. Rather than sending messages to all neighboring caches, for example, a single request is sent to a central cache having a directory, which is consulted for the location of a requested copy nearest to the requester.

Although the use of a directory reduces the amount of traffic needed to locate and obtain a copy of a cached object, using directories introduces a cache coherence problem. That is, once a data object is changed, all copies of the data object must be changed and all of the directories must be updated by a maintenance system. Distributed coherence protocols are used to maintain the coherence of objects and directories, invalidating old copies of objects and updating directory entries using messages sent over the network. However, this message traffic can burden a network, particularly a large network with many objects that change frequently.

When a copy of an object is outdated (i.e., the original data object has changed), invalid copies are invalidated and removed, or ejected, from the caches. Further, the directory referring to the cached copy is updated. This is implemented in certain known systems by assigning a time-to-live (TTL) parameter to each copy. The TTL parameter specifies the date and time at which the stored copy of the data object expires, and is to be deleted. When the TTL is reached, the copy is ejected from the caching system (deleted from the cache). The traffic required to eject a copy that has become outdated before the TTL has expired is too burdensome to implement in known large caching systems. Hence, known systems only maintain a weak coherence based on the TTL parameter. The coherence is weak because the cached copy of an object that is changed shortly after it is cached will remain available long after it has become outdated, until its TTL expires. This problem can be solved by broadcasting a message to delete copies of an object and their entries in directories, but this further burdens the network with traffic.

Locking and acknowledgment further contribute to the poor scalability of known caching systems. When a directory is updated in known systems, it must be locked (access prevented) while it is being changed. This renders the directory unavailable during the update. Further, acknowledgment messages must be sent to indicate that an update has been received, further burdening the network. A scalable, directory-based caching system that requires no locking or acknowledgment would more efficiently and effectively improve network performance than do known caching systems.

SUMMARY OF THE INVENTION

The present invention provides a scalable, distributed, directory-based caching system that advantageously and efficiently manages object caching on a network without requiring locking and acknowledgment, that generates less caching network traffic and requires less memory and processing power than known caching systems.

In accordance with the present invention, a user request for an object is received by a receiving cache. The receiving cache carries out a locator function using the network address of the requested object as an input, and providing a pointer as an output. In one embodiment, the pointer points to the network address of a directory cache that stores the directory list for the object. A directory list for an object includes the network address of the object and the network addresses of object caches each of which purportedly store a copy of the object.

The receiving cache sends an object request message to the directory cache, which then polls the object caches on the directory list. The object caches send messages in response to the receiving cache that indicate if each object cache stores a copy of the object.

The receiving cache sends an object request message to the object cache that sent the first message received by the receiving cache indicating that the sending object cache stores a copy of the object. In response, the sending object cache sends a copy of the object to the receiving cache, which stores a copy and forwards a copy to the user.

The directory list is then updated by adding the network address of the receiving cache. Outdated cached copies of objects are deleted in a distributed fashion whenever a new copy is sent to a cache from the original source server of the object. The coherence of the cached copies is further enhanced by associating a time-to-live parameter with each copy. The time-to-live parameter is also associated with the object cache address on the directory list for the object.

The distributed features of the present invention render it scalable and efficient for caching copies of data objects and providing such copies to users quickly and economically.

DETAILED DESCRIPTION

Figure 1:
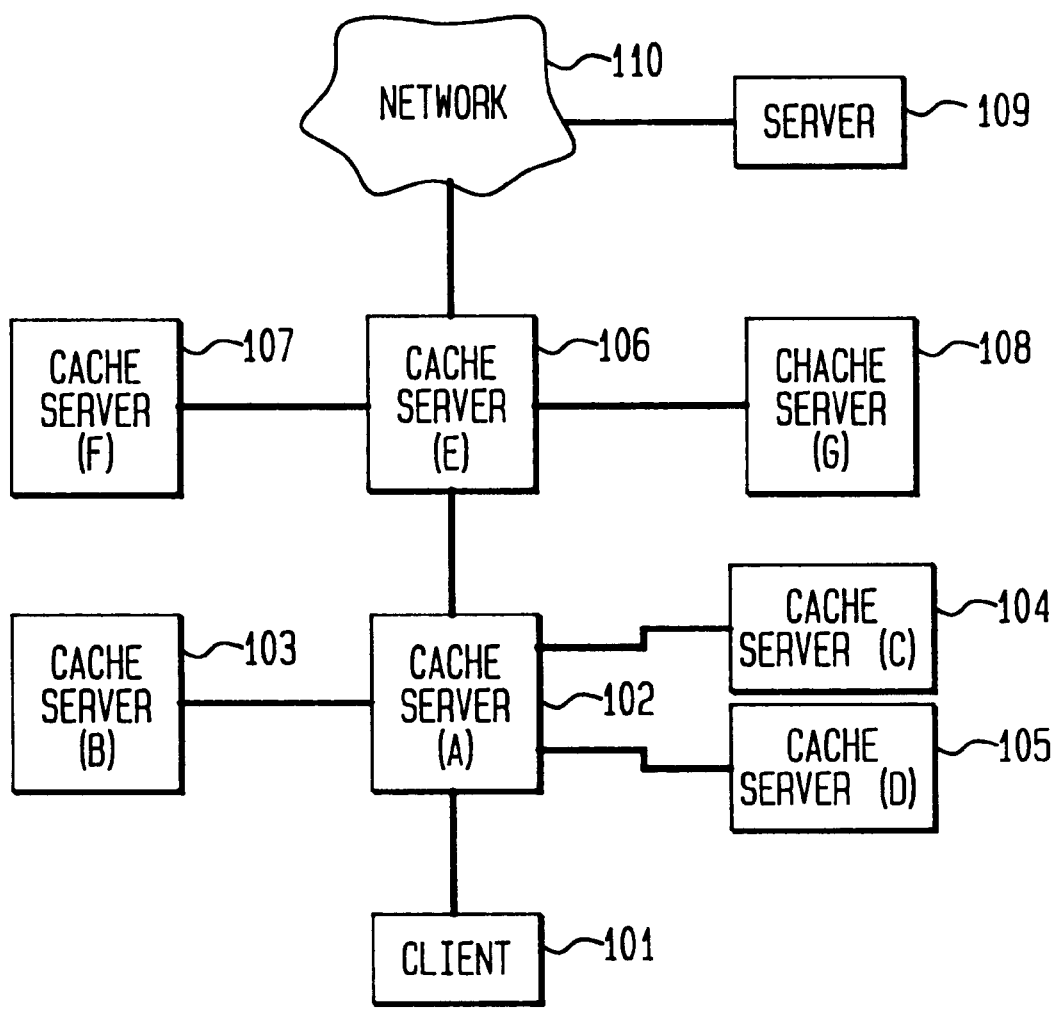
FIG. 1 shows a prior art embodiment of a caching system.

The present invention provides a scalable distributed caching system implemented with caches on a network. A cache is a server, and includes a data bus connecting a processor, computer readable memory, and a port to be coupled to a network. A cache in accordance with the present invention stores a copy of a data object. A cache can also store (or store alone) a directory list for an object that lists the addresses of caches that store copies of the object. A cache also can implement a hash locator function useful for locating the network address of a cache that stores a directory list for an object, based upon the network address of the object. As used herein, the term "network address of an object" is any designation capable of specifying the location of the source of the original object on the network. An example of a network address of an object is the Uniform Resource Locator (URL) of the object at its original source. The term "network address" when referring to a server (such as a cache) is any designation capable of specifying the location of the server on the network. The term "network address" when referring to a cached copy of an object refers to any designation capable of locating the cached copy of the object on the network. An example of a network address of a cached copy of an object is a URL.

In accordance with the present invention, each cached data object has a directory list. Each address on the directory list for an object is the address of a cache that stores a copy of the object (an object cache). In a preferred embodiment, the directory lists are distributed among several caches (directory caches). An embodiment of a directory list data structure in accordance with the present invention is as follows:

```
Directory_list
{
        directory_object_address /*network address of the
        list object*/
        {
                /*the addresses of five object caches at which copies of
                the list object are stored*/
                object_cache_address_1
                object_cache_address_2
                object_cache_address_3
                object_cache_address_4
                object_cache_address_5
        }
}
```

Each cache that receives an object request from a client has a hash locator function. The input of the hash locator function is the network address of an object. The output of the locator function is the address (or pointer thereto) of the directory cache on which the directory list for the requested object is stored. In this way, the receiving cache can locate the directory cache for any cached object. If the requested object has no directory list (i.e., the locator function does not point to any directory cache), then a request is sent to the original source server for the requested object to be sent to the receiving cache. The receiving cache stores a copy of the requested object and then sends a copy to the client. The receiving cache then starts a directory list for the object that contains the receiving cache address as an object cache. In one embodiment, the receiving cache also stores the directory list for the object. From this example, it is shown that a cache may be a receiving cache (receive a client request), a directory cache (store a directory list for an object), and an object cache (store a copy of an object) at the same time.

Figure 5:
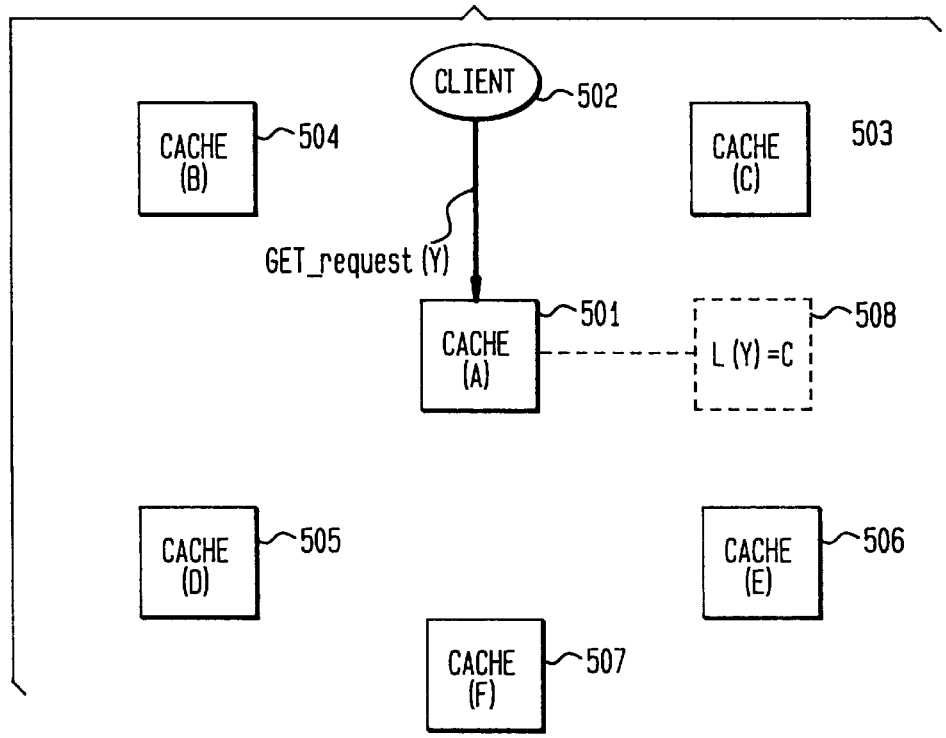
FIG. 5 shows an embodiment of a caching system in accordance with the present invention where a client sends a request for an object to a receiving cache, and the receiving cache carries out a directory locator function for the requested object.

FIG. 5 shows a receiving cache, cache A 501 receiving a request for a data object (denoted "GET_request(Y)" in FIG. 5) that has a network address Y from a client 502. Receiving cache A 501 implements hash locator function L using address Y as an input, and obtaining directory cache address C as an output. This indicates that cache C 503 stores the directory list for object Y. An embodiment of the data structure of the directory list for object Y is as follows:

```
Directory_list
{
        Y       /*network address of object Y*/
        {
                /*the addresses of object caches B, D, E and F, each of
                which stores a copy of directory list object Y*/
                B
                D
                E
                F
        }
}
```

This shows that copies of data object Y are stored on object caches B 504, D 505, E 506 and F 507. Receiving cache A 601 (FIG. 6) sends a message (denoted "lookup" in FIG. 6) requesting the data object to directory cache C 602. In the embodiment shown in FIG. 6, directory cache C 602 sends a message to receiving cache A 601 (denoted "List[B,D,E, F]" in FIG. 6) that includes the object cache addresses from the directory list. Cache A 601 uses this list to poll the object caches and select one from which to receive object Y. In another embodiment of the present invention, directory cache C 602 does not send a message including directory list addresses to the receiving cache A 601. Rather, directory cache C 602 itself polls the object caches (B-603, D-604, E-605 and F-606 in the embodiment shown in FIG. 6) and asks the object caches to send UDP ping hit or miss messages to receiving cache A 601. Receiving cache A 601 then decides from which object cache to request a copy of object Y, and sends a message to the selected object cache requesting the selected cache to send the copy.

The present invention is more efficient than known directory systems that use a non-distributed directory to locate cached copies of a given object. In one known system, a single non-distributed directory residing on one server is consulted for every request for a cached object. The single directory returns at least one address of a cache on which the requested object is stored. This known system is disadvantageous because the single server can act as a bottleneck for all requests for cached objects, thus defeating the objective of caching, i.e., enhanced system performance in quickly and reliably returning a requested object. The network can be excessively burdened by request and response message traffic between clients and the single directory server, as well as by maintenance traffic designed to keep the directory accurate. The load on the single directory server can be heavy, reducing its speed of performance, and making it unavailable for other (non-directory) tasks. Also, a non-distributed directory can be very large, taking up substantial memory resources on the server, and be slow and tedious to search, taking a large amount of processor time. A single directory is also a single point-of-failure for the caching system. If the single directory server fails, the entire caching system becomes inoperative, and all of the memory resources devoted to storing cached copies in object caches is wasted.

An obvious partial solution in known systems is to place several copies of the non-distributed directory in several different locations on the network (i.e., on several different servers with different network addresses.) This can help reduce the bottleneck and single-point-of-failure effects of having a single directory server because a client can consult one of many non-distributed directories to obtain the address of an object cache. This helps distribute the load of directory lookup activities. Further, if one directory server fails, another can be consulted. However, this solution can exacerbate the caching system traffic burden on the network, because the directories need to be kept accurate. Hence, a change in the state of a cached copy (e.g., a cached copy becomes out-of-date, or a new object is cached, etc.) requires that update messages be sent to all directory servers, which generate further traffic in the form of acknowledgment messages. This can disadvantageously generate a substantial amount of message traffic, burdening the network. Further, as is the case with the single non-distributed directory, non-distributed directories in known systems having more than one directory must be locked during update, rendering them unavailable. In a large system with rapidly changing object states, updating and locking can occur so frequently as to substantially reduce the availability of a directory for lookup. Also, the problems of absorbing memory and processor resources can be exacerbated by having several copies of a large non-distributed directory.

The present invention solves these problems, advantageously providing a distributed directory for the caching system that can be used and maintained more efficiently and economically than known systems. By dividing the directory into directory lists in accordance with the present invention and distributing them across numerous servers, the directory lookup load is advantageously distributed across a larger number of servers than known systems. The problems of bottlenecking and single-points-of-failures is substantially reduced or eliminated. The memory resources required to store the directory are substantially smaller on each directory server than on directory server in non-distributed directory caching systems, freeing the server to store other data besides directory data. Further, the advantageously distributed directly lookup load absorbs far less processor time on any one server, enabling a directory server to quickly and efficiently respond to lookup requests, and carry out other tasks. A further advantage of the present invention is the low level of directory maintenance traffic it requires, thus advantageously reducing the burden on the network compared to known systems. The present invention does not use acknowledgment messages and advantageously never locks directory data for updates, and does not use acknowledgment messages.

The search system determines where copies of a requested object are stored, if any. As described above, in accordance with the present invention, a cache receives a request (called a "get request") for an object from a client. FIG. 5 shows an embodiment of a cache system where the client 502 sends a get request to Cache A 501. Upon receiving the request, the receiving cache, Cache A 501, first determines if it stores the requested object itself. If it has the requested object, the requested object is sent to the client 502. If it does not store the requested object, it must locate the object elsewhere.

If Cache A 502 does not store the requested object, it executes a directory list locator function L 508. As described above, directory list locator function L 508 operates on the network address of the requested data objects an input and yields address (or pointer thereto) of the cache which stores the directory list for that object as the output. Hence, if cache A 501 receives a request from a client 502 for data object Y, and cache A 501 determines that it does not store object Y, then cache A carries out L 508 to determine the location of the directory list for Y. As shown in FIG. 5, L(Y)=C, meaning that cache C 503 stores the directory list for object Y.

Figure 13:
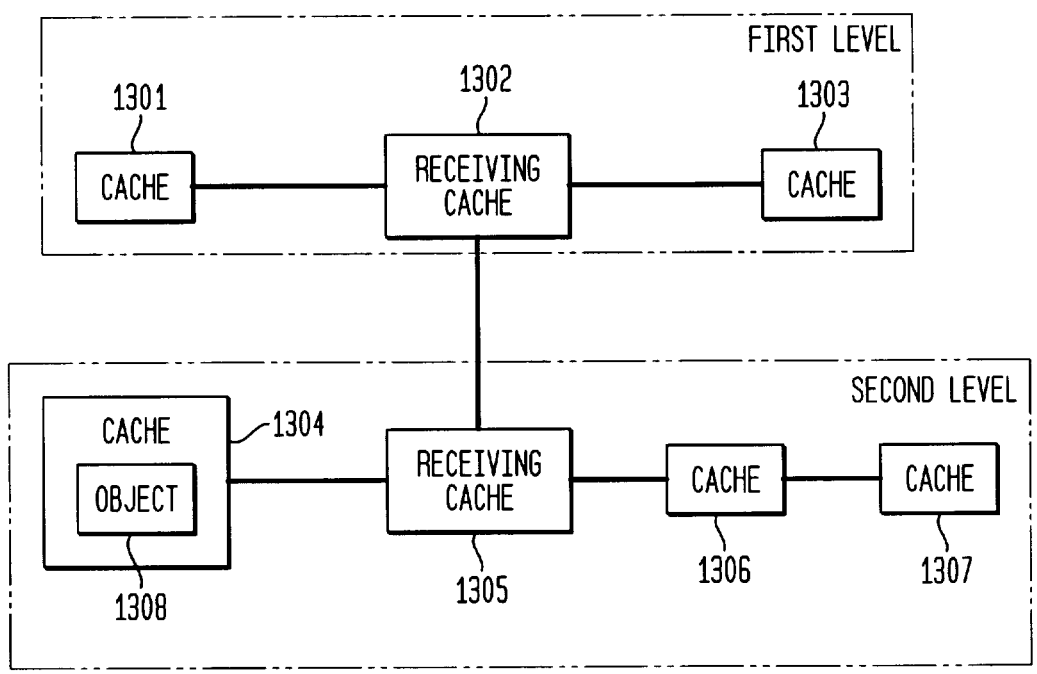
FIG. 13 shows a cache system with caches on a first logical level and caches on a second logical level in accordance with an embodiment of the present invention.

In certain embodiments of the present invention, the locator function does not indicate a network address. This indicates that there is no copy of the object stored on a cache within logical reach of the receiving cache carrying out the locator function, or that no copy of the object is stored on any cache. FIG. 13 shows an embodiment of the present invention that illustrates the case where no copy of the object 1300 is stored on a cache 1301, 1303 or 1305 within the logical reach of the caches (1301, 1302, 1303, 1304, 1305, 1306 and 1307) receiving cache 1302 cache is one in which caches are grouped on logical levels (e.g., a first logical level a second logical level as shown in FIG. 13) in a hierarchy of logical levels. A cache (e.g. 1301) on a first logical level of caches 1301, 1302 and 1303) can search for and obtain copies of objects stored on other caches 1302 and 1303 on the same level. To obtain a copy of an object 1308 stored on a cache 1304 on a second level, an object request message is sent to a receiving cache 1305 on the second level, which initiates a search and attempts to obtain a copy of the object from a cache 1304, 1306 or 1307 on the second level. Upon obtaining the copy, a copy is sent to the receiving cache 1302 on the first level. A receiving cache 1302 on the first level in this embodiment chooses to send an object request to a receiving cache 1305 on a second level when the locator function returns a pointer indicating that no cache 1301, 1302 or 1303 logically available to the receiving cache 1302 on the first level stores a directory list for the object.

Alternatively, the receiving cache chooses in another embodiment of the present invention to request a copy of the object from the server storing the original version of the object when the pointer returned by the locator function indicates that no cache logically available to the receiving cache stores a directory list for the object.

Thus, the hash function L 508 comprises a function that uses an object network address as an input and provides a pointer as an output where the information indicated by the pointer determines the subsequent behavior of the present invention. If the pointer indicates a network address of a directory cache storing a directory list for the object, an object request is sent from the receiving cache to the directory cache. On the other hand, if a pointer indicates no network address, or indicates no network address of a logically available cache (e.g., the address of a cache on the same hierarchical level), then an object request message is sent to a receiving cache on another hierarchical level, or else to the original source server for the object. In one embodiment, a table correlating locator function pointers with information such as directory cache network addresses is entered in a receiving cache by hand by a system administrator. In another embodiment, a message is sent to receiving caches that updates the pointer table. For example, if a new directory list is started for a newly cached object X at a directory cache Z, then a message is sent to a receiving cache with the network address of the object X, the network address of directory cache Z, and a flag indicating that the pointer table is to be updated. The receiving cache receives the message, carries out the hash function on the network address of the object, and correlates the resulting pointer value to the network address of cache Z. Thus, when a request for object X is received by the receiving cache, it carries out the hash locator function on X, obtains a pointer, and correlates the pointer to the network address of cache Z. Then the receiving cache sends a lookup request to cache Z in accordance with the present invention.

In the example shown in FIG. 5, cache A 501 has received a get request for an object Y. Cache A 501 has determined that object Y is not stored on itself, and has carried out locator function L 508 on the network address of Y. In this example, L(Y)=C, meaning that cache C 503 stores the directory list for object Y.

Figure 6:
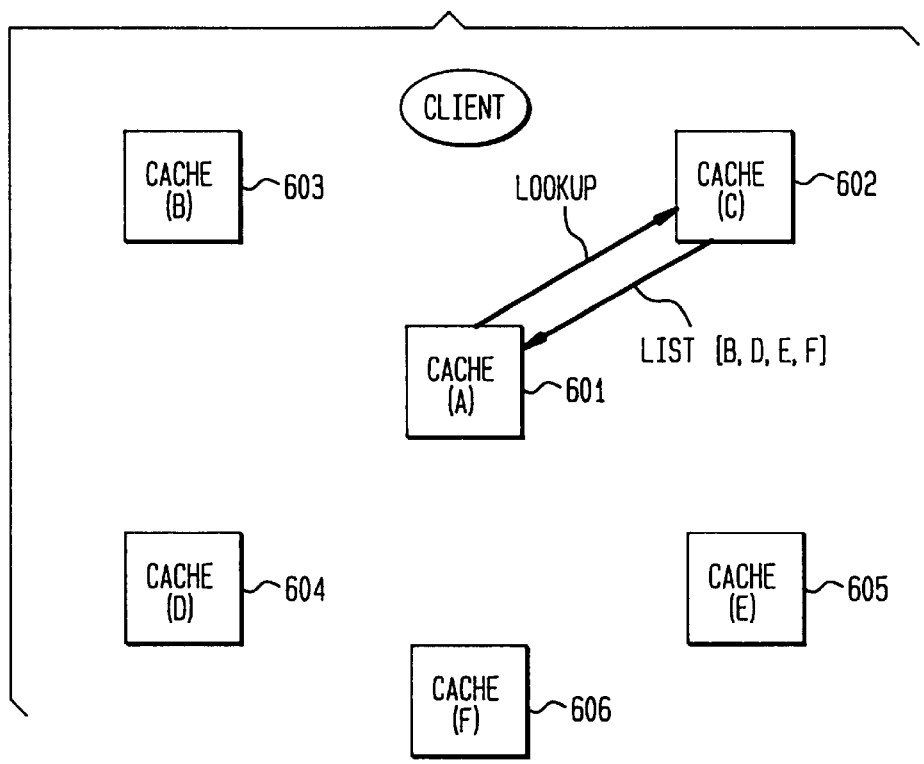
FIG. 6 shows an embodiment of a caching system in accordance with the present invention where a receiving cache sends a lookup request to a directory cache in response to a request for an object from a client.

FIG. 6 shows the system of FIG. 5 after the directory list locator function L 508 has identified cache C as the directory cache for object Y. Cache A 601 then sends a "lookup request" to cache C 602. In one embodiment, the lookup request comprises the address of the requested object Y and the address of the requesting cache, cache A 601. Cache C 602 returns the directory list cache addresses for the requested object Y to cache A 601, which then implements a decision system to select a cache from which to request a copy of the object. In another embodiment, cache C 602 does not send the directory list to cache A 601. Rather, it sends out UDP ping requests to object caches on the directory list for the requested object, along with the network address of cache A 601. The object caches respond with UDP ping hit or UDP ping miss messages to cache A 601.

A key advantage of the present invention is its scalability. The efficient scalability of the search function is achieved because the directory is distributed in the form of directory lists across many servers. The correct directory list for a given object is found by the hash locator function implemented in a receiving cache. Thus, a great number of different objects cached on a large number of different servers on the network can be readily and efficiently found by consulting a hash locator function and a short directory list, rather than carrying out a full search of a single non-distributed directory burdened by numerous requests and residing on one server.

Once the addresses of caches which have copies of the requested object are determined, a decision system is implemented that determines from which cache the copy of the requested object will be sent. In one embodiment of the present invention, if no cached copy of the requested object exists, then the receiving cache sends a request for the object to the object's original source server. In another embodiment, the receiving cache sends a request for the object to another cache at another hierarchical level of the caching system.

As described before, in one embodiment of the present invention, object cache addresses are sent to the receiving cache from the directory cache in response to a lookup request from the receiving cache, in which case the receiving cache polls the object caches. In another embodiment, object cache addresses are not sent to the receiving cache, in which case the directory cache polls the object caches. Either way, UDP ping hit and/or miss messages are sent from the object caches to the receiving cache, which then decides which object cache to ask to send a cached copy of the requested object.

Figure 7:
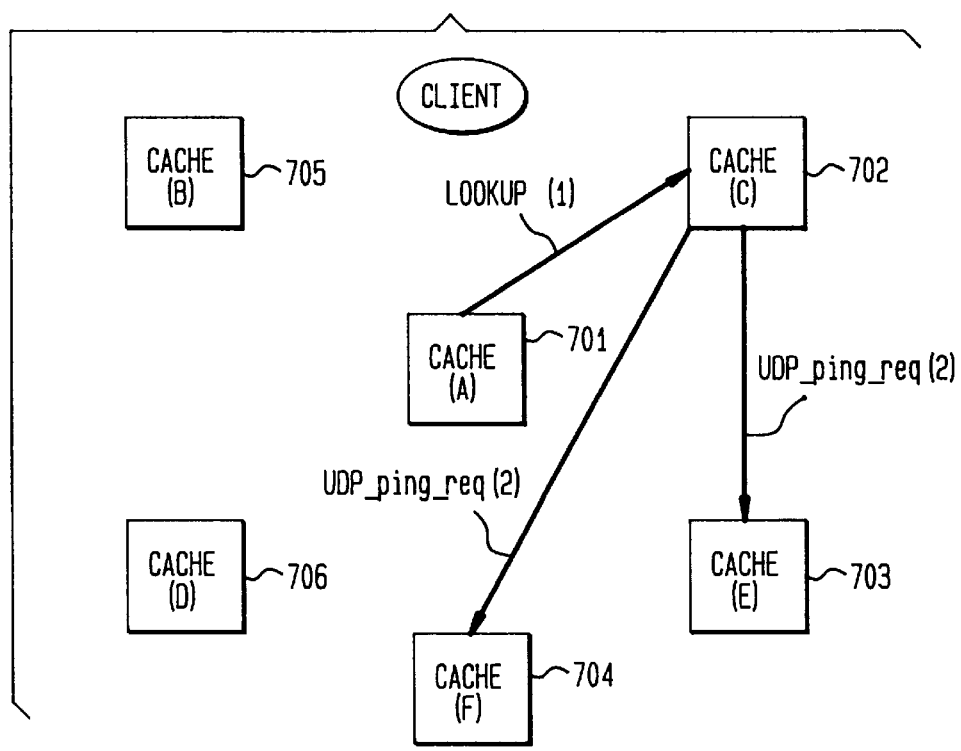
FIG. 7 shows an embodiment of a caching system in accordance with the present invention where a directory cache sends UDP ping requests to caches on the directory list for a requested object.
Figure 8:
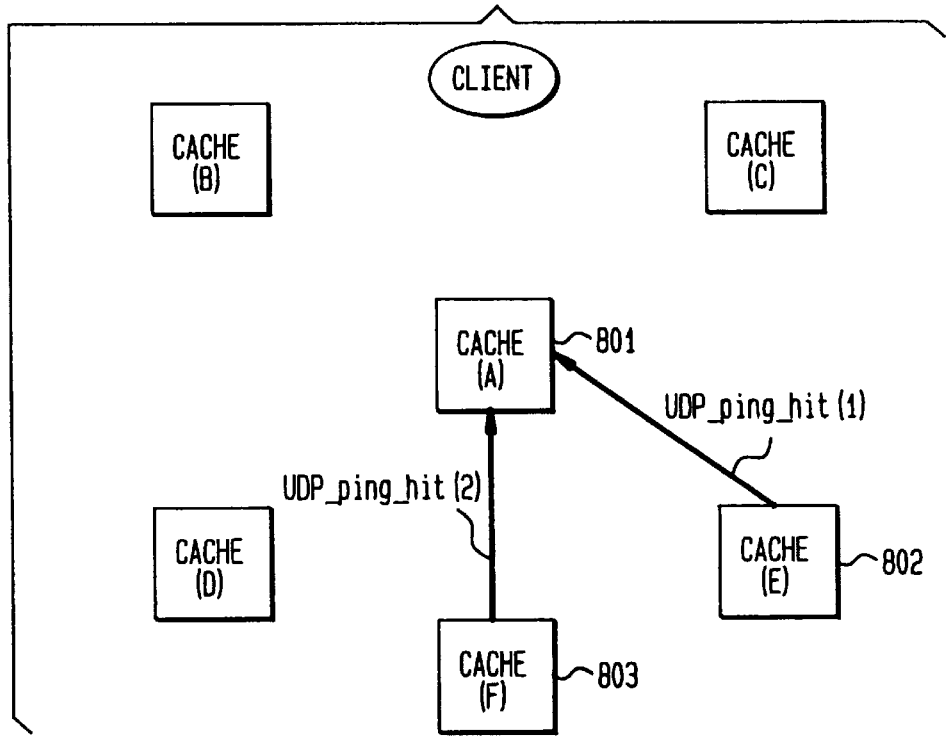
FIG. 8 shows an embodiment of a caching system in accordance with the present invention where caches on the directory list for a requested object respond with UDP ping hit messages to a directory cache.
Figure 9:
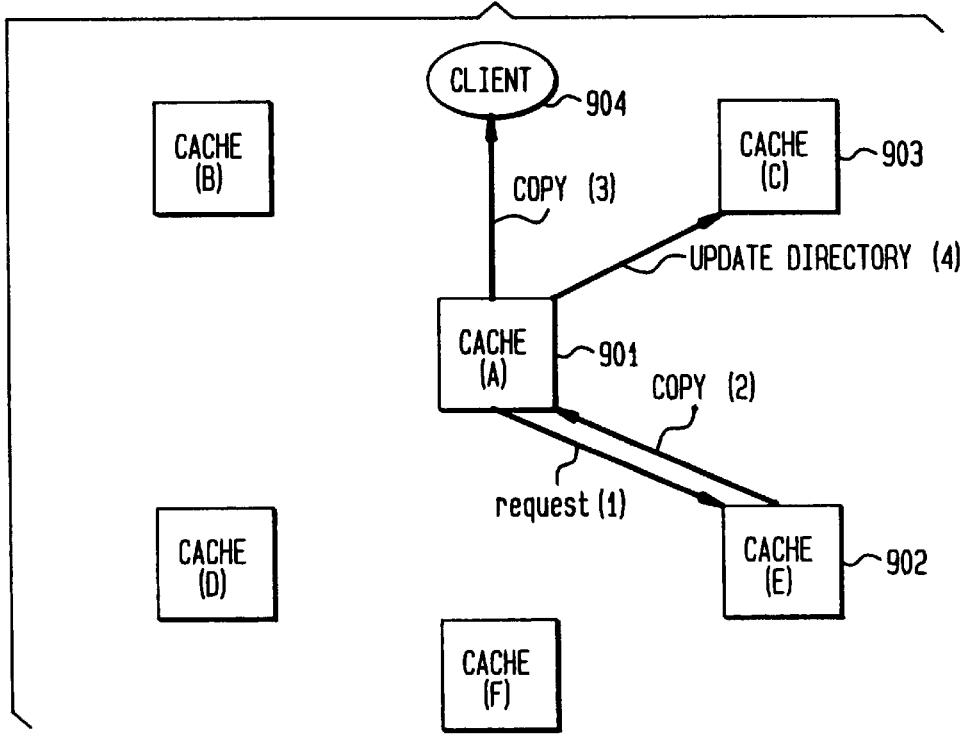
FIG. 9 shows an embodiment of a caching system in accordance with the present invention where a receiving cache sends an object request message to a cache on the directory lit, the cache sends a copy of the requested object to the receiving cache, and the receiving cache sends a copy of the object to the client.

An embodiment where the object cache addresses are not sent to the receiving cache is shown in FIG. 7. Cache A 701 has received a request for object Y from the client. Cache A 701 has carried out a directory lookup function L(Y)=C, (not shown) indicating that the directory list for object Y is stored on cache C 702. Receiving cache A 701 sends a lookup message to directory cache C 702 ("lookup(1)"). The directory list for Y in this example stored on cache C 702 indicates that copies of Y are stored on caches E 703 and F 704. Directory cache C 702 sends a UDP ping request to object caches E 703 and F 704. As shown in FIG. 8, Cache A 801 first receives a UDP ping hit response ("UDP_ping_ hit(1)") from cache E 802, and then a UDP ping hit response "(UDP_ping_hit(2)") from cache F 803. As shown in FIG. 9, cache A 901 then sends a request for a copy of object Y to cache E 902 because the first UDP ping hit received by cache A 901 was from cache E 902. This decision criteria advantageously assures that the object is requested from the cache that is "nearest" to the receiving cache A 901 in a network sense, based upon the lower delay in response time between cache A 901 polling the object caches and receiving cache E's 902 UDP ping hit message, compared to receiving cache F's 903 UDP ping hit message. In response to the request from cache A 901, cache E 902 sends a copy of object Y to cache A 901, which stores a copy and forwards a copy to the requesting client.

The directory list for object Y is now inaccurate because it does not reflect that cache A 901 has a copy of object Y. In one embodiment of the present invention, cache A 901 sends a message to cache C to update the directory list. Cache C 903 adds the network address of cache A 901 to the directory list for object Y. Cache A 901 thus becomes an object cache for Y.

In another embodiment of the present invention, cache C 702 (FIG. 7) does not send a UDP ping request to all caches whose addresses appear on the directory list for the requested object. Rather, cache C (702) selects a fixed number of addresses, alpha, from the list. Suppose that the directory list for object Y in the example shown in FIG. 7 is B 705, D 706, E 703 and F 704. Cache C 702 chooses alpha to be two, and cache C 702 selects caches E 703 and F 704 from the directory list to which to send UDP ping requests along with the address of cache 801 A. Cache E's 802 (FIG. 8).UDP ping hit message is received first by cache 801 A, so cache 801 A sends a request to cache E ("request(1)", FIG. 9) for the object. A copy of the requested object is sent ("copy(2)") 902 from cache 902 E to cache A 901 (FIG. 9). A copy of the object is stored on cache A 901 and a copy is sent ("copy(3)") to the requesting client 904. Cache A 901 sends a message to cache C 903 to update its directory list for Y by adding the address for cache A 901.

Whenever alpha is less than the number of addresses on the directory list, the cache must decide which of the caches from the directory list it will send UDP ping requests. In one embodiment, the cache uses a round robin method to advantageously distribute the load among the caches on the list. In another embodiment, the cache randomly selects alpha caches to which to send a request.

Figure 10:
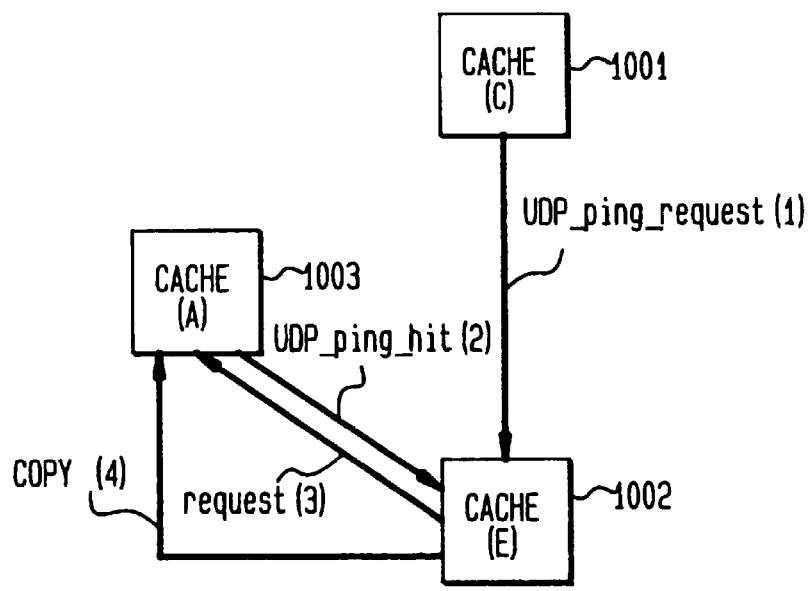
FIG. 10 shows an embodiment of a caching system in accordance with the present invention where only one object cache is sent an object request message.
Figure 11:
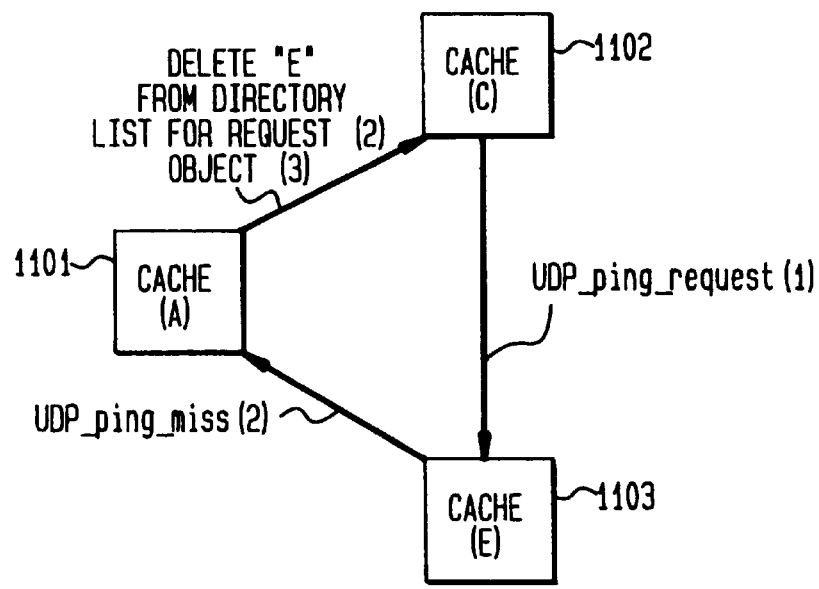
FIG. 11 shows an embodiment of the present invention where a cache sends a delete request message to a directory cache.

In one embodiment of the present invention, the directory cache chooses a single cache on the directory list to which to send a UDP ping request, i.e., alpha is one. For example, suppose cache C 1001 (FIG. 10) chooses cache E 1002. Cache C 1001 sends UDP ping request message along with the address of cache A 1003 to cache E 1002, and cache E 1002 sends a response (either UDP ping hit or UDP ping miss) directly to cache A 1003. If the response is UDP ping hit, then cache A 1003 sends a request for the object to cache 1002 E. If the response is UDP ping miss, then the directory list is inaccurate, and cache 1101 (FIG. 11) A sends a directory delete request to cache C 1102, which deletes cache E's 1103 address from the directory list for the requested object.

On the other hand, if cache E fails to respond to a request for the object from cache A, then the cache E or the connection to cache E may be inoperative, and another cache on the directory list must be selected and sent a UDP ping request.

Figure 2:
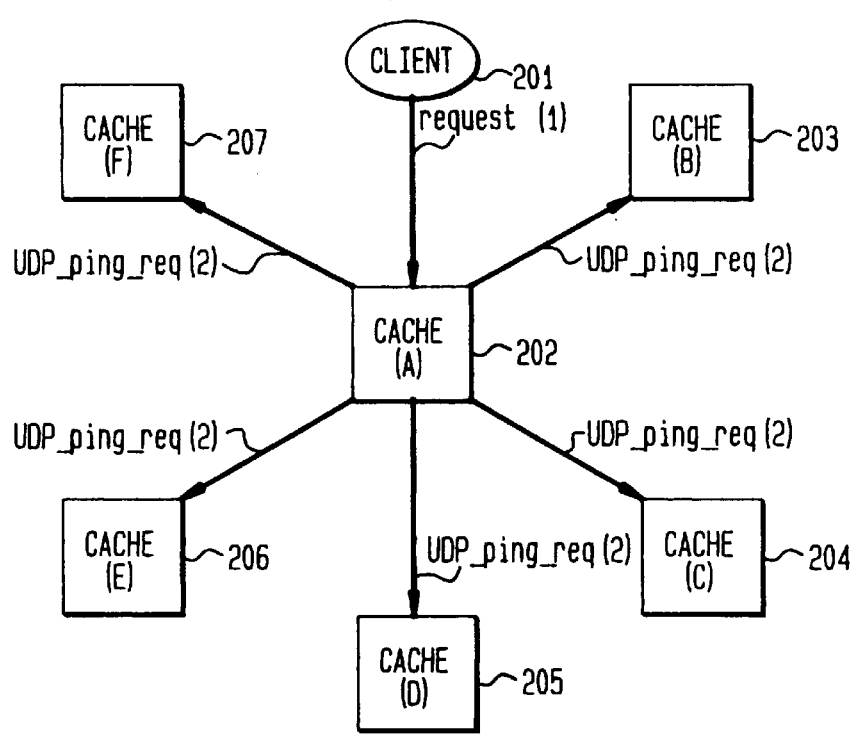
FIG. 2 shows a prior art caching system in the process of carrying UDP ping requests.
Figure 3:
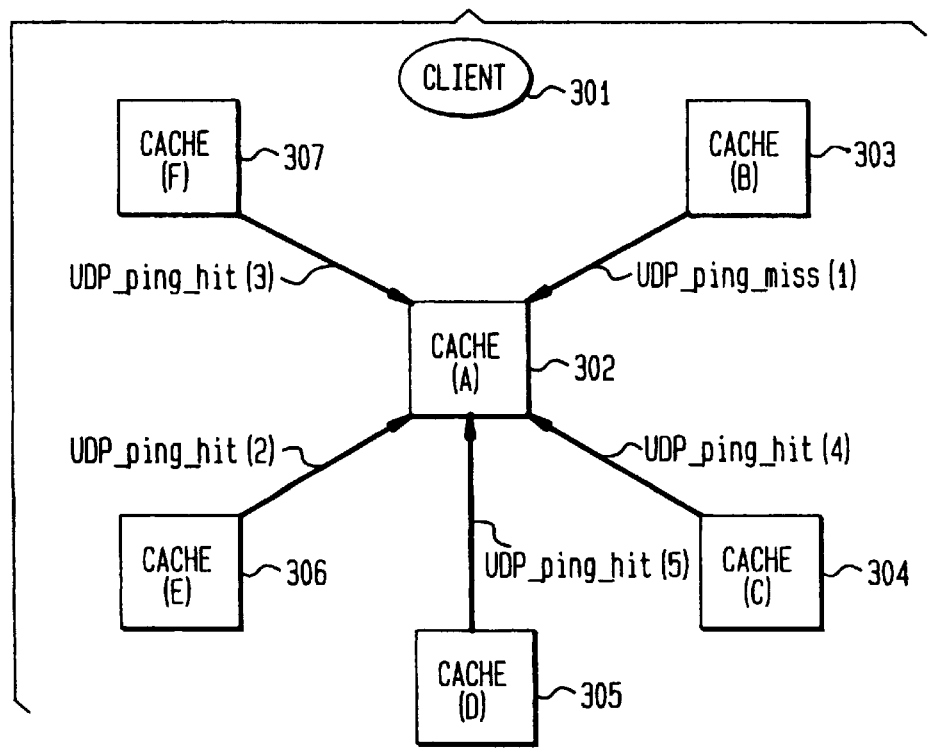
FIG. 3 shows a prior art caching system in the process of carrying UDP ping hit and UDP ping miss messages.
Figure 4:
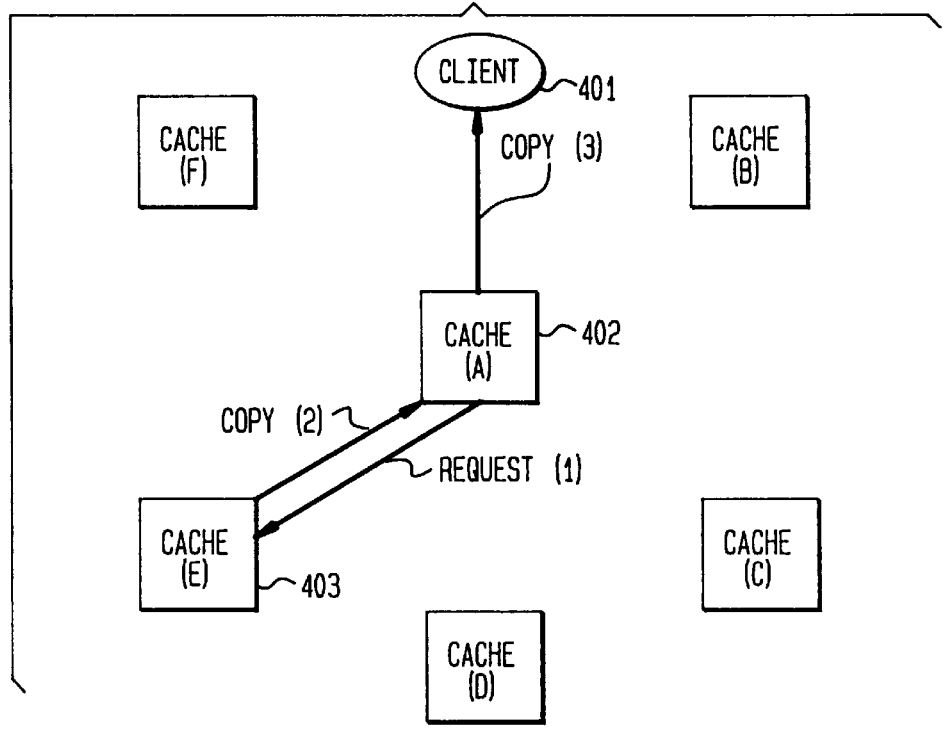
FIG. 4 shows a prior art caching system in the process of carrying a request for a copy of an object, and carrying a copy of the requested object to a cache and a client.

When alpha is one, the number of messages needed to retrieve a copy is advantageously reduced to four, not including the message that carries a copy of the requested object from cache C 1001 to cache A 1003. This is far more efficient then the known decision function shown in FIGS. 2, 3 and 4, which requires 2N+1 messages to achieve the same goal. Implementing the decision function in accordance with the present invention for alpha=1 provides good caching performance in a reliable network when the probability of failure of either a connection or a machine is very low, and when cache C 1001 implements an efficient method for distributing the load among all caches. The strategy of updating a directory list as the decision system is implemented represents an "optimistic approach," so called because it operates efficiently for highly reliable networks (i.e., networks with highly reliable machines and connections.)

Certain networks are less than thoroughly reliable. An example of such a network is the Internet, where it is difficult or impossible to predict whether a given machine or connection is operating or is unavailable at any given time. Further, an efficient distribution of the load among caches is difficult to obtain because different directory and receiving caches make independent decisions about where to send requests for data objects. In other words, a cache attempting to evenly distribute load can be unaware of how loads are being placed independently on other caches, causing unexpected concentrations data object requests on one or more caches. Choosing alpha=1 can be inefficient because the chosen cache may not be able to send the requested object is because the cache or the connection to the cache is temporarily inoperative. Hence, a "pessimistic approach" strategy is advantageously implemented where the directory list is not updated while the decision function is implemented, except that the appropriate address is added to a directory list whenever a cache receives a new object, or deleted from a directory list if a cache ejects (deletes) an object.

When alpha is one and the response to the object request is negative (e.g., a UDP ping miss or no response is received), another cache is chosen, and a whole new set of UDP ping messages exchanged to cause the other cache to send the requested object, if possible. Another risk of choosing alpha=1 is that the directory list is inaccurate and the single chosen cache does not in fact have a copy of the requested object. Choosing alpha>1 alleviates these problems in unreliable networks by introducing redundancy into the process of obtaining a copy of the object, seeking the requested object in more than one possible location. This redundancy also mitigates the effect of having some inaccurate directory entries that are not corrected under the pessimistic approach.

In one embodiment of the present invention, alpha is chosen to be a constant, K. In this case, if the number of caches on the directory list is N and N<K, then a UDP ping request is sent to N caches that store a copy of the requested object and K–N caches that do not store a copy, and the efficiency of the present invention approaches that of the known caching systems. If the number of caches on the directory list is N and N>K, then the cache chooses K caches from the directory list and sends each a UDP ping request. The number of messages generated in this case is less than or equal to 2K+3, not including the message that carries the copy of the requested object. This can be efficient in a reliable network for the same reasons discussed above for alpha=1. But in an unreliable network, it fails to take full advantage of the redundancy gained by sending a UDP ping request to all of the caches on the directory list that purport to have copies of the requested object.

In accordance with the present invention, the value of alpha is advantageously selected to maximize caching system performance according to the reliability of the network on which the present invention is implemented. In highly reliable networks, alpha is selected to be closer to one. In less reliable networks, alpha is selected to be greater than one, its value being selected to be greater the less reliable the network. However, alpha in unreliable networks should be at most equal to the number of addresses in a directory list. In one embodiment of the present invention implemented on an unreliable network, the size of each directory list is fixed at K addresses, and alpha is set to be equal to K. In another embodiment of the present invention, alpha is set to be the average number of addresses on all directory lists. In yet another embodiment, alpha is set to be the median number of addresses on all directory lists. Under the optimistic approach, a cache sends a directory add request to the cache that stores the directory list for the object only when the cache receives an original copy, i.e., when the cache sends request for the object to the object's original source. Upon receiving the directory add request, the directory cache will add the sending cache's address to the directory list for the given object. Also under the optimistic approach, the cache requesting a copy of a given object will send a directory delete request to the directory cache whenever the requesting cache fails to receive a copy of the requested object from an object cache, deleting the object cache address from the directory list for that object. Also, a directory delete request is sent by an object cache to the appropriate directory cache whenever the object cache ejects the object, whereupon the object cache address is deleted from the directory list.

Under the pessimistic approach, a cache sends a directory add request to the directory cache each time the cache receives a new copy of a given object, from whatever source. No directory delete request is sent when the requesting cache fails to obtain a requested copy. Rather, a directory delete request is only sent to the appropriate directory cache whenever the cache storing the object ejects the object. This directory delete request is sent by the ejecting object cache. Upon receiving the delete request, the ejecting object cache address is deleted from the directory list.

Figure 12:
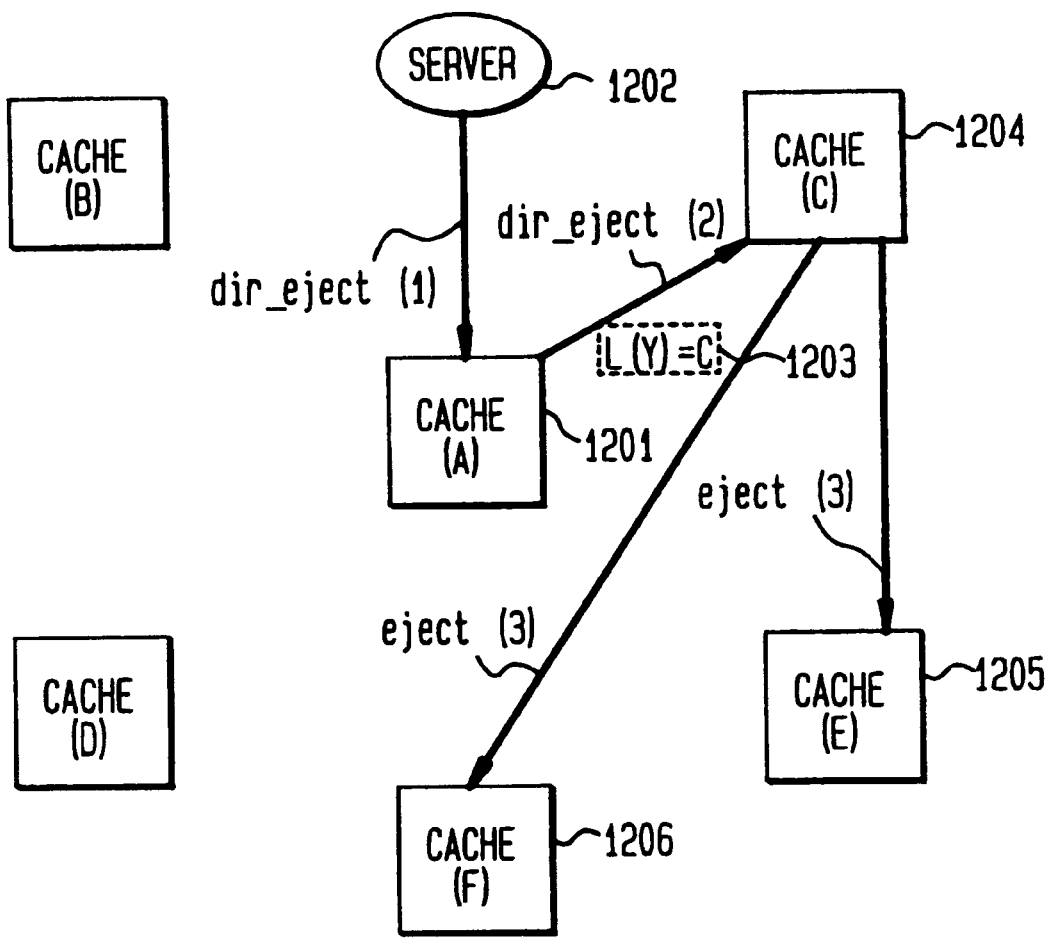
FIG. 12 shows an embodiment of a caching system in accordance with the present invention where a server sends a directory eject message for a given object to a receiving cache, the receiving cache carries out a directory locator function on the given object, the receiving cache sends a directory eject message to a directory cache, and the directory cache sends eject messages to caches on the directory list for the given object.

When a data object is outdated, it must be ejected from a cache where it is stored, as shown in FIG. 12. This is accomplished in accordance with one aspect of the present invention by associating a time-to-live (TTL) parameter with each stored object. The TTL parameter specifies the maximum lifetime of a cached object. In one embodiment, the TTL parameter is a date-time stamp offset a fixed amount of time from the time a copy of the object is received and stored at the cache. When the TTL expires, the object is ejected. The TTL parameter is implemented in known systems, where it can disadvantageously allow outdated copies to persist in caches. This problem is addressed in known systems by broadcasting a ejection message to all caches for a given object when the object becomes outdated (e.g., the original is changed). However, the broadcast of ejection messages generates substantial traffic that can disadvantageously burden a network.

The present invention solves this problem by efficiently ejecting outdated cached copies in a distributed fashion, thus avoiding costly broadcast messages. An object may be ejected before the expiration of its TTL in accordance with the present invention by sending an ejection request from the original source of an object to the directory cache for the object whenever the original object is changed. The directory cache then sends ejection messages to all of the object caches on the directory list for the object. The object caches then delete the object, and the directory list itself is deleted from the directory cache.

This is shown in FIG. 12. Cache A 1201 receives a request from original source server 1202 to eject all copies of object Y. Cache A 1201 carries out directory locator function L(Y)=C, 1203 showing that the directory list for object Y is stored on directory cache C 1204. Cache A 1201 then sends a directory eject request to cache C 1203. The directory list for Y on cache C 1203 indicates that cached copies of Y are stored on caches E 1205 and F 1206. Upon receiving the directory eject request, cache C 1003 sends an eject request to caches E 1205 and F 1206, which eject their copies of Y. Cache C 1203 then deletes its directory list for Y. In another embodiment, cache A sends a directory eject request to the directory server whenever cache A receives a copy of an object from the object's original source server. This embodiment advantageously requires no ejection message from the original source server. The present invention advantageously eliminates the need to broadcast an eject message to all directory caches as is carried out in certain known caching systems. This substantially reduces the amount of network traffic generated to eject outdated copies of objects, thus more efficiently maintaining the accuracy of the caching system.

The distributed ejection scheme implemented in accordance with the present invention advantageously eliminates the need to broadcast an ejection message to all caches as is known in the art. The distributed ejection scheme is more efficient and economical than the broadcast method, as it generates only the network traffic needed to eject the outdated objects. Further, distributed ejection operates as efficiently for large systems as for small systems, and is thus more scalable than the broadcast system, which generates increasingly large and burdensome amounts of traffic as the size of the network increases.

The present invention advantageously provides a more efficient and scalable caching system than known caching systems. It provides a distributed directory in the form of directory lists, with each directory list associated with a data object. A directory list is a list of object caches on which a copy of an object is stored. The directory lists for objects are distributed across numerous servers in the network. The location of a directory list for a given object is easily and economically determined from a hash locator function that correlates the network address of the object with a pointer to the network address of the directory cache on which the directory list is stored. A number of object caches from the directory list are polled, and one is selected from which to receive the cached copy. The number of object caches can be advantageously selected in accordance with the present invention to maximize caching system performance in various network environments of different reliabilities. Directory lists are updated in a distributed fashion in accordance with the condition of the network. Outdated objects and directories are ejected from the caching system in an efficient distributed fashion. The present invention can be implemented with greater reliability and less cost than known caching systems. Further, the present invention solves many of the problems associated with known caching systems, as the present invention is less susceptible to bottlenecking, single-points-of-failure, and burdens the network with substantially less caching system network traffic than known systems.

Pseudo code embodiments of various aspects of the present invention follow. A client seeking to obtain a copy of a given object sends a get request message to a cache. As shown in FIG. 5, the get request for object Y is sent from the client 502 to cache 501 A. A pseudo code embodiment of a get request is as follows:

```
GET_request(input: url_of_object) /*url_of_object is the network
                                   address of the requested object*
{
...
dest_IPaddr := HASH_TABLE_NEIGHBORS
                [hash_l(url_of_object)];
    /*the above line is the directory locator function, implemented in
    this embodiment as a hash function on the network address of
    the object*/
if dest_IPaddr is equal to my_IPaddr     /*does the locator function
                                           point to the directory cache
                                           itself?*/
then lookup (url_of_object, my_IPaddr);  /*if the locator function points
                                           to the directory cache, a
                                           lookup routine is run that
                                           will send a copy to the
                                           requesting client*/
else send (dest_IPaddr, lookup (url_of_object, my_IPaddr));
    /*the above line sends a lookup request to the cache other than the
    receiving cache on which the directory list is located (the "directory
    cache") as indicated by the lookup function*/
loopuntil (response is equal to UDP_ping_hit
    or response is equal to NO_neighbors
    or waiting_time expired
    or number_of_responses is equal to alpha)
    wait (response, neighbor_IPaddr);
```

```
/*this loop continues to run until either a first UDP ping hit message is
received, or a message to the effect that no copy of the requested
object is stored on caches with which the receiving cache may directly
communicate, or a given waiting time has expired with no response,
or the number of responses is equal to a predetermined number alpha*/
if response is UDP_ping_hit
then send(neighbor_IPaddr, request(url_of_object,
my_IPaddr));
/*if a UDP ping hit is received, then a message is sent to the sender of the
UDP ping hit to send the requested object to the receiving cache at
network address my_IPaddr*/
else send(home_url_IPaddr, Get_request(url_of_object,
my_IPaddr));
/*if no UDP ping request is received, then the original source of the
requested object at home_url_IPaddr is asked to send a copy of
the requested object to the receiving cache*/
...
}
```

The above embodiment of a get request implements a directory lookup request. A pseudo code for a lookup request is as follows:

```
dir_lookup (input: url_of_object, client_IPaddr;
       output: list_of_neighbors)
       /*client refers to the sender of the lookup request*/
{
find_URL(url_of_object);          /*find the directory list associated
                                    with the network address of requested
                                    object*/
if url_of_object is found         /*if the directory list for the requested
then return (list_of_neighbors);    object is found, the return the
                                    list of addresses on the
                                    directory list*/
else return (null_list);
if optimistic approach
    find_CLIENT(client_IPaddr);
    /*under the optimistic approach, the directory list is updated by
    adding the address of the client cache if the client cache address
    is not already on the list*/
    if client_IPaddr is not found
    add_neighbor_to_list (url_of_object,
       client_IPaddr);
}
```

A pseudo code embodiment of a directory lookup routine that selects alpha addresses from a directory list is as follows:

```
lookup (input: url_of_object, requester_IPaddr)
{
dir_lookup (url_of_object, requester_IPaddr, list_of neighbors);
if list_of_neighbors is null_list
then send (requester_IPaddr, (NO_neighbors, my_IPaddr));
else
    make alpha_list by choosing alpha neighbors from list_of_neighbors;
    send (alpha_list, UDP_ping_req (requester_IPaddr));
}
```

A pseudo code embodiment of a UDP ping request/hit/miss routine is as follows:

```
UDP_ping_req (input: url_of_object, client_IPaddr)
       /*client is the sender of the UDP ping request*/
{
find object url_of_object in local cache;
if object is found
    then send (client_IPaddr, UDP_ping_hit (my_IPaddr));
    else send (client_IPaddr, UDP_ping_miss (my_IPaddr));
}
```

An embodiment of pseudo code for the directory add routine is as follows:

```
dir_add (input: url_of_object, client_IPaddr)
       /*client refers to a cache to which a copy of an object has
       been added*/
{
find_URL (url_of_object);
if url_of_object is not found
    add_new_list (url_object);   /*start a new directory list*/
find_CLIENT (client_IPaddr);     /*look for the client network address
                                   on the directory list*/
if client_IPaddr is not found    /*if not found, add it to the directory list*/
    add_neighbor_to_list (url_of_object, client_IPaddr);
}
```

A pseudo code embodiment of a directory delete routine is as follows:

```
dir_del (input: url_of_object, client_IPaddr)
       /*client refers to a cache from which a copy of an object has
       been deleted*/
find_URL (url_of_object);         /*look for address of object on directory
                                    list*/
if url_of_object is found         /*if address is found, delete the address
                                    from the directory list*/
    find_CLIENT (client_IPaddr);
    if client_IPaddr is found
       delete_neighbor_from_list (url_of_object client_IPaddr);)
```

An pseudo code embodiment of an ejection routine is as follows:

```
eject_local_copy (input: url_of_object)
{
...
dest_IPaddr := HASH_TABLE_NEIGHBORS
[hash_l(url_of_object)];
/*the above line carries out the directory locator function as a hash
function to locate the cache on which the directory list for the object is
stored*/
if dest_IPaddr is equal to my_IPaddr /*if directory cache is local cache,
                                       delete directory list on local cache*/
then dir_del;(url_of_object, my_IPaddr);
else send (dest_IPaddr, dir_del(url_of_object, my_IPaddr));
    /*otherwise send a directory delete request to the directory cache*/
}
```

A pseudo code embodiment of a refresh routine that obtains a copy of the object from the original source is as follows:

```
refresh (input: url_of_object)
{
...
dest_IPaddr := HASH_TABLE_NEIGHBORS
[hash_l(url_of_object)];
       /*directory locator function*/
if optimistic approach /*under optimistic approach, update directory list
                         when refresh routine is executed*/
    if dest_IPaddr is equal to my_IPaddr
    then dir_add(url_of_object, my_IPaddr);
    else send (dest_IPaddr, dir_add(url_of_object, my_IPaddr));
}
```

A pseudo code embodiment of a routine that tests whether a response is received from a destination and implements the appropriate maintenance strategy is as follows:

```
wait_response (input: status)
{
...
dest_IPaddr := HASH_TABLE_NEIGHBORS
[hash_l(url_of_object)];
    /*above line is directory locator function*/
if status is OK and pessimistic approach   /*under the pessimistic
                                             approach, and a copy is
                                             received, then the
                                             directory list is
                                             updated by adding
                                             the address of the
                                             receiving cache*/
    if dest_IPaddr is equal to my_IPaddr
    then dir_add(url_of_object, my_IPaddr);
    else send (dest_IPaddr, dir_add(url_of_object, my_IPaddr));
if status is not OK and optimistic approach /*under optimistic approach,
                                             if a copy is not received,
                                             then the directory list is
                                             updated by deleting
                                             the address of the
                                             receiving cache*/
    if dest_IPaddr is equal to my_IPaddr
    then dir_del(url_of_object, my_IPaddr);
    else send (dest_IPaddr, dir_del(url_of_object, my_IPaddr));
}
```

A pseudo code embodiment of the distributed ejection scheme in accordance with the present invention is as follows:

```
dir_eject (input: url_of_object)
{
dest_IPaddr := HASH TABLE_NEIGHBORS
[hash_l(url_of_object)];
    /*above line is directory lookup function*/
if dest_Ipaddr is not equal to my_IPaddr  /*check local cache first*/
then send (dest_IPaddr, dir_eject (url_of_object));
else
    find_URL(url_object);  /*find the directory list*/
    if url_of_object is found
    then
        send (list_of_neighbors, eject(url_of_object));
        clear the list_of_neighbors;  /*clear the directory list*/
eject (url_of_object); /* eject local copy */
}
```

A pseudo code embodiment of the eject routine is as follows:

```
eject (input: url_of_object)
{
find object url_of_object in local cache;
if object is found
then remove object url_of_object from the local cache;
}
```

The present invention advantageously provides a more efficient system and method for caching objects on a network than know caching systems. The use of distributed methods in accordance with the present invention advantageously provides an scalable way to store, find, obtain and eject cached objects, providing improved network, even as the number of data objects on the network increasing performance while imposing a lower caching traffic burden on the network. The present invention also performs better than known caching system on networks whose data objects change frequently. This is advantageously achieved without the need for locking acknowledgments, and broadcast messages that unduly burden networks in known caching systems.

What is claimed is:

1. A scalable distributed caching system for users on a network with data objects having network addresses, comprising a receiving cache that receives a request for an object from a user, said receiving cache comprising a data bus connecting a receiving cache processor, a receiving cache computer readable memory and a receiving cache port adapted to be coupled to a network, wherein said receiving cache carries out a directory locator function that uses the user request for a data object as an input and provides a pointer to a directory cache as an output, said directory cache comprising a directory cache data bus connecting a directory cache processor, a directory cache computer readable memory and a directory cache port adapted to be coupled to a network, wherein said directory cache stores a directory list for the requested object in said directory cache computer readable memory, said directory list comprising the network address of the requested object and a network address of an object cache on the network, said object cache comprising an object cache data bus connecting an object cache processor, an object cache computer readable memory and an object cache port adapted to be coupled to a network, and wherein said object cache is adapted to store a copy of the requested object in said object cache computer readable memory of said object cache.

2. The system of claim 1, wherein said receiving cache, directory cache and object cache are logically grouped on a first level on the network in a hierarchy of levels on the network, and further comprising a second receiving cache, second directory cache and second object cache that are logically grouped on a second level in said hierarchy of levels, and wherein said receiving cache on said first level sends a request for the object requested by the user to said second receiving cache on said second level if said pointer does not indicate the address of a directory cache.

3. A method for implementing a scalable distributed caching system on a network that receives a request from a user for a data object stored on the network, comprising the steps of:

storing a copy of a data object on a first object cache on the network, said object cache having an object cache network address;

storing a directory list on a directory cache on the network, said directory list including the network address of an object and a network address of an object cache on which a copy of the object is purportedly stored;

receiving a request for an object from a user at a receiving cache, wherein the request includes a network address of the object;

performing a locator function at a receiving cache that receives a request for an object from a user, the request including a network address of the object, the locator function using the network address of the object as an input and providing a pointer to the directory cache as an output, wherein the directory cache stores a directory list for the object, where the directory list is a list of addresses of object caches that purport to store a copy of the object; and sending a request for the object to an object cache on the directory list.

4. The method of claim 3, further comprising the step of sending an object request message from the receiving cache to the directory cache whose address is indicated by the pointer, wherein the object request message includes a request for a copy of the data object.

5. The method of claim 4, further comprising the step of sending an object cache location message from the directory cache to the receiving cache, wherein the object cache location message includes the location of an object cache included on the directory list for the object.

6. The method of claim 4, further comprising the step of sending an object storage status request from the directory cache to an object cache whose address is on the directory list for the object, the object storage status request requesting the object cache to send an object storage status response to the directory cache indicating if the object cache stores a copy of the object.

7. The method of claim 5, further comprising the step of sending an object storage status request from the receiving cache to an object cache whose address is included in the object cache location message from the directory cache to the receiving cache, the object storage status request requesting the object cache to send an object store status response to the receiving cache indicating if the object cache stores a copy of the object.

8. The method of claim 6, further comprising the steps of:

receiving an object storage status response at the directory cache from an object cache indicating that the object cache stores a copy of the object;

sending an object request message from the directory cache to the object cache requesting the object cache to send a copy of the object to the directory cache; and sending a copy of the object from the object cache to the directory cache.

9. The method of claim 7, further comprising the steps of:

receiving an object storage status response at the receiving cache from an object cache indicating that the object cache stores a copy of the object;

sending an object request message from the receiving cache to the object cache requesting the object cache to send a copy of the object to the receiving cache; and sending a copy of the requested object from the object cache to the receiving cache.

10. The method of claim 8, further comprising the step of storing a copy of the object at the directory cache.

11. The method of claim 9, further comprising the step of storing a copy of the object at the receiving cache.

12. The method of claim 10, further comprising the steps of adding the address of the directory cache to the directory list for the requested object, a copy of which is stored on the directory cache.

13. The method of claim 11, further comprising the steps of:

a. sending a message from the receiving cache to the directory cache storing the directory list for the object to add the address of the receiving cache to the directory list for the object; and b. adding the address of the receiving cache to the directory list for the object.

14. The method of claim 10, further comprising the step of sending a copy of the object from the directory cache to the user that requested the object.

15. The method of claim 11, further comprising the step of sending a copy of the object from the receiving cache to the user that requested the object.

16. A scalable distributed caching system on a network, comprising:

a. means for storing a copy of a data object;

b. means for storing a directory list for the object, the directory list identifying the network locations at which copies of the object are purportedly stored;

c. means for determining the network location at which the directory list for an object is stored;

d. means for selecting a location from which a copy of the object is to be requested; and e. means for sending to a user a copy of the object from a selected location at which the copy is stored.

17. The system of claim 16, further comprising means for adding a new network locations at which an object is stored to the directory list for the object.

18. The system of claim 16, further comprising means for determine when a network location on a directory list for an object is outdated and means for deleting the outdated network location from the directory list for the object.

19. The system of claim 16, further comprising means for deleting a stored copy an object.

20. The system of claim 16, further comprising means for deleting a directory list for an object.

21. The system of claim 16, further comprising means for obtaining a copy of an object from the original source of the object.

* * * * *

UNITED STATES PATENT AND TRADEMARK OFFICE
CERTIFICATE OF CORRECTION

PATENT NO.   : 6,154,811
DATED        : November 28, 2000
INVENTOR(S)  : Srbljic et al.

It is certified that error appears in the above-identified patent and that said Letters Patent is hereby corrected as shown below:

Drawings,
FIG. 5, remove the term "PRIOR ART" from Figure 5.

Signed and Sealed this

Tenth Day of September, 2002

Attest:

Attesting Officer

JAMES E. ROGAN
*Director of the United States Patent and Trademark Office*